D. E. WALKER.
SHIELD FOR RUBBER TIRES.
APPLICATION FILED MAR. 13, 1908.
920,795.
Patented May 4, 1909.
3 SHEETS—SHEET 1.
Fig-1-
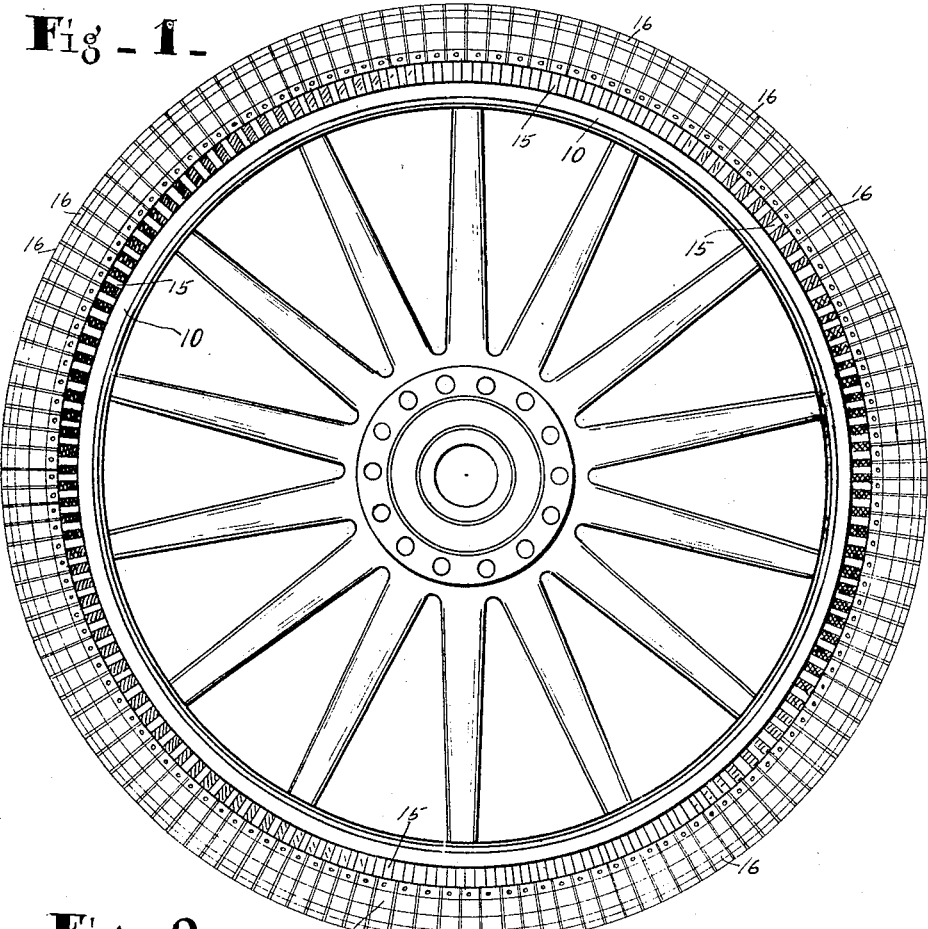
Fig-2-
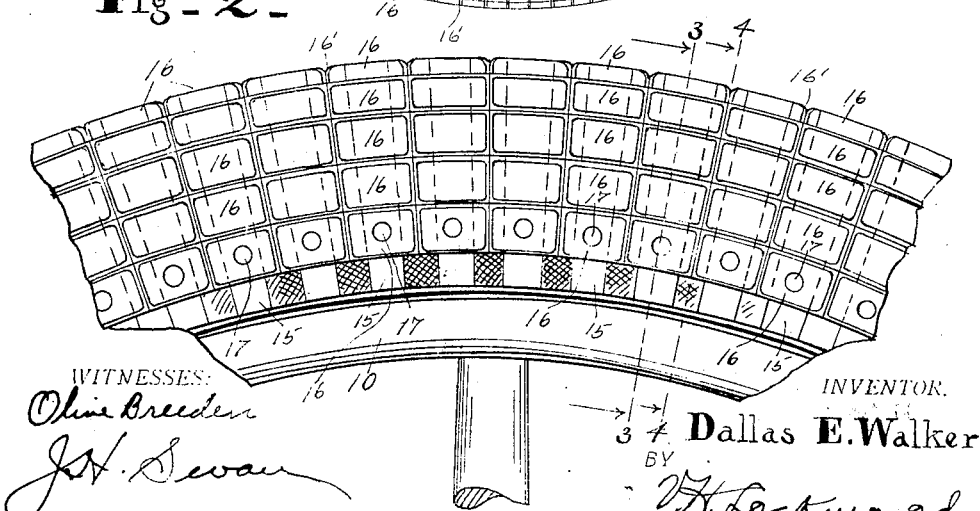
WITNESSES:
Olive Breeden
J. H. Swan
INVENTOR.
Dallas E. Walker.
BY
V. H. Lockwood,
ATTORNEY.

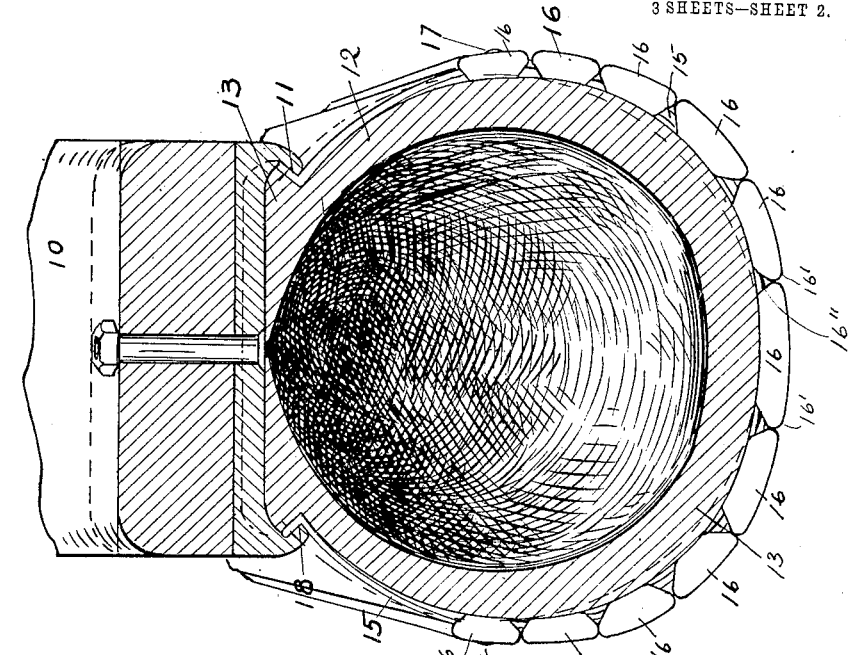
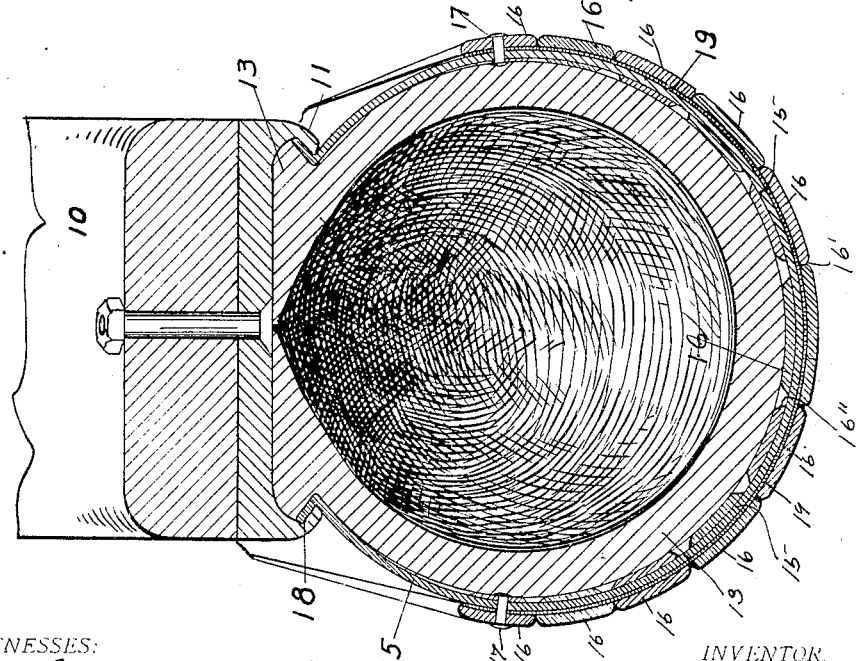

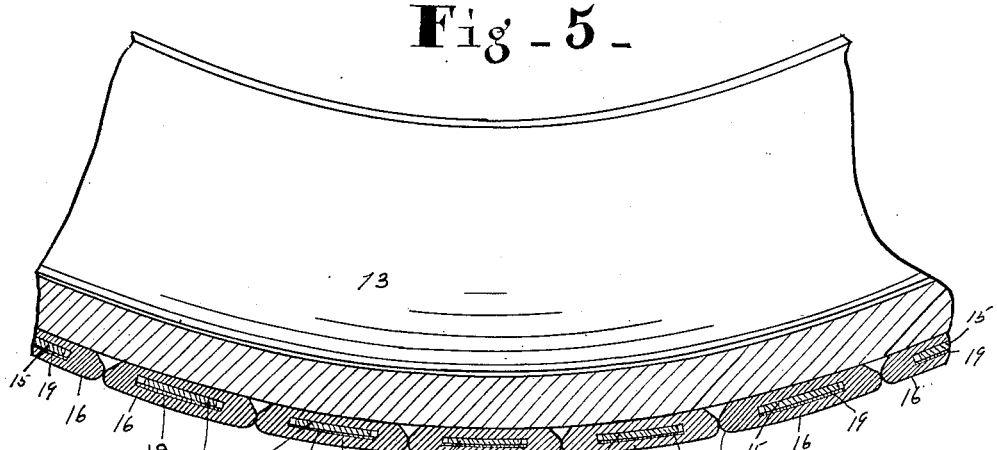
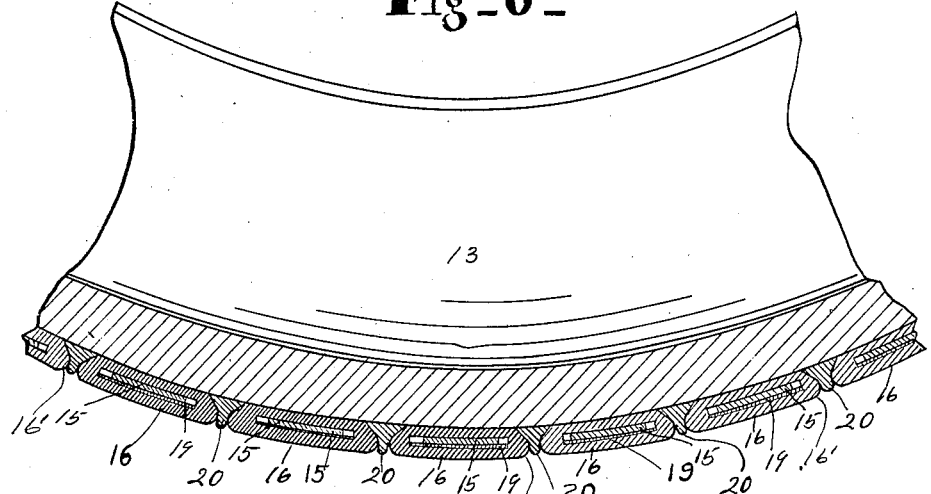
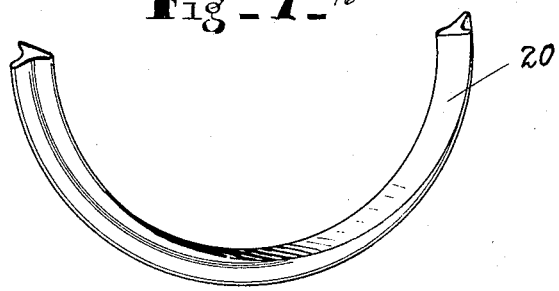

UNITED STATES PATENT OFFICE.

DALLAS E. WALKER, OF INDIANAPOLIS, INDIANA.

SHIELD FOR RUBBER TIRES.

No. 920,795.

Specification of Letters Patent.

Patented May 4, 1909.

Application filed March 13, 1908. Serial No. 420,940.

*To all whom it may concern:*

Be it known that I, DALLAS E. WALKER, of Indianapolis, county of Marion, and State of Indiana, have invented a certain new and useful Shield for Rubber Tires; and I do hereby declare that the following is a full, clear, and exact description thereof, reference being had to the accompanying drawings, in which like numerals refer to like parts.

The object of this invention is to provide a practical and efficient metal tread tire for vehicle wheels, and one which is simple of construction and arrangement, easy to assemble, and is readily repaired.

One feature of the invention consists in combining with a resilient tire, such as a pneumatic or rubber tire, a series of transverse surrounding metal tread members that are readily put in place on the tire or removed by catching under the edges of the rim or otherwise.

Another feature of the invention consists in constructing said transverse metal tread members so that they are readily collapsible or can be pressed inwardly, but cannot be expanded or be pressed outwardly. This arrangement furnishes the desired yielding character of the tire and yet resists expansion beyond the normal size of the tire so as to greatly strengthen the tire. This feature of the invention is accomplished by securing to a band, metal or otherwise, transversely surrounding the tread portion of the tire and having secured to said band metal plates with their inner adjacent edges beveled and their outer adjacent edges abutting, so that lateral expansion thereof will be impossible by reason of the abutting of said plates, while the inner movement or collapsing is possible because said plates are beveled at their inner adjacent edges.

Along with the foregoing are the features of tapering the transverse metal tread members from the middle toward each end so they fit snugly together against each other in series; also providing means between the band and plates forming each tread member to prevent rattling; also providing an elastic packing between the tread members to prevent them rattling.

The full nature of this invention will be understood from the accompanying drawings and the following description and claim:

In the drawings Figure 1 is a side elevation of an automobile wheel equipped with the metal tread constituting this invention. Fig. 2 is a side elevation of a portion of the rim and tire of said wheel on a larger scale. Fig. 3 is a transverse section of the wheel on the line 3—3 of Fig. 2. Fig. 4 is a section on the line 4—4 of Fig. 2. Fig. 5 is a longitudinal central section through the tire. Fig. 6 is a similar longitudinal section, showing the modified form wherein flexible packing rings are located between the tread members. Fig. 7 is a perspective view of one of said packing rings.

In detail there is shown in Fig. 1 an automobile wheel with a rim 10, which rim is shown also in Figs. 3 and 4 as having lateral inturned flanges 11 between which the ends of the rubber tire 12 are clamped and by which the tire is held in place. For that purpose each side of the rubber tire has an outwardly extending flange 13 that projects under the inwardly extending flange 11 on the rim. There is nothing peculiar to this invention in the construction of the rim and tire of the wheel excepting that this invention is peculiarly adapted to resilient and inflated tires.

The invention consists in combining with a resilient or inflated tire a number of transversely extending metal tread members. Each of these metal tread members may be made, as herein shown, of a metal band or strip 15 on which there is slipped or threaded a number of metal plates 16. It is immaterial, however, how the metal plates 16 are secured to the strip 15 or of what material the strip 15 is made provided it be located interiorly to the abutting edges of the plate 16. It is preferable, however, it is believed, to provide an opening through the plates 16 through which the strip 15 may extend. The two end plates 16 are secured rigidly to the strip 15 by rivets 17 which extend entirely through the outer two plates 16 of the series but the rivets may extend only through the inner part of the plates. The strip 15 may be about one-half inch wide and long enough to encircle the tire and its ends are turned outward at an angle to form the hooked portions 18 that catch under the flanges 11 on the tire and thereby the tread members are held in place. By reason of this feature of the construction the tread members are readily put in place or removed. For illustration, one end of the tread members is inserted behind one flange 11 and then the tread member is put about the tire and the other end pressed in behind the other flange 11, the side of the rubber tire yielding while this insertion takes place. The contrary treatment will readily remove the tread member.

The plates 16 are about one inch long, that is longitudinally of the tire but taper from the middle plate to each end of the series and somewhat less in width, as the most of them may be about one-half inch wide, although the plate located exactly at the tread portion of the tire is usually made wider, substantially twice as wide as the other plates. The plates are all made substantially alike and their inner adjacent edges 16' are beveled or separated, whereas their outer adjacent edges abut against each other. The result of this arrangement is that the tread member cannot be spread laterally or widened because the outer edges of the plates abut against each other but it may be collapsed or its ends drawn together because the inner edges 16' are beveled and permit a contracting flection of the tread member. Also the inner lateral edges 16'' of each plate 16 are beveled, as shown in Fig. 5, so that said tread members with reference to each other will not interfere with the longitudinal flexibility of the tire, as shown in Fig. 5.

A sufficient number of the tread members are placed on a tire to completely envelop it and make a continuous metal tread out of the series of tread members. To prevent noise of the plates a raw-hide strip 19 is placed between the plates 16 and the band 15.

In the modified form shown in Figs. 6 and 7 I place a rubber packing ring 20 transversely of the tire and extending about one-half of the way around the same between each pair of tread members. This packing ring fills the space between the tread members so that there is no play between them and no noise or rattling and yet it does not interfere with the flexibility of the wheel.

It is thus seen that I provide a continuous metal tread for a resilient or inflated tire which is formed in a very easy manner of simple, separate tread members that in no wise tend to reduce the flexible or yielding nature of the tires and yet fully protect the rubber tires from contact with the street. Since the tire is completely encircled longitudinally, said tread members hold each other in place and coöperate to resist strain. By reason of their connection with the rim of the wheel they cannot creep upon the tire.

I do not wish to be limited to any particular material for the strips 15 nor to any particular means or manner for securing the plates 16 to said strip, nor to any particular means for securing the metal tread members to the rim nor to the use of rawhide strips or rubber packing strips to prevent noise.

What I claim as my invention and desire to secure by Letters Patent is:

The combination with a flexible tire, of a metal tread composed of a series of tread members mounted transversely of the tire and formed of a strip of flexible material, and metal plates secured to said strip with their outer edges abutting against each other and their inner edges beveled to permit contraction but prevent expansion of said tread members.

In witness whereof, I have hereunto affixed my signature in the presence of the witnesses herein named.

DALLAS E. WALKER.

Witnesses:
OLIVE BREEDEN,
J. H. SWAN.